US011916743B2

(12) United States Patent
Corson

(10) Patent No.: US 11,916,743 B2
(45) Date of Patent: *Feb. 27, 2024

(54) PROFILE GENERATION FOR BANDWIDTH MANAGEMENT

(71) Applicant: Sony Interactive Entertainment Inc., Tokyo (JP)

(72) Inventor: Gregory Corson, Foster City, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 129 days.

This patent is subject to a terminal disclaimer.

(21) Appl. No.: 17/235,828

(22) Filed: Apr. 20, 2021

(65) Prior Publication Data

US 2021/0306221 A1  Sep. 30, 2021

Related U.S. Application Data

(63) Continuation of application No. 16/219,828, filed on Dec. 13, 2018, now Pat. No. 10,985,988, which is a
(Continued)

(51) Int. Cl.
*H04L 41/0896* (2022.01)
*H04L 47/24* (2022.01)
*H04L 47/783* (2022.01)

(52) U.S. Cl.
CPC ........ *H04L 41/0896* (2013.01); *H04L 47/24* (2013.01); *H04L 47/783* (2013.01)

(58) Field of Classification Search
CPC .... H04L 41/0896; H04L 47/24; H04L 47/783
See application file for complete search history.

(56) References Cited

U.S. PATENT DOCUMENTS

| 9,614,732 B2 | 4/2017 | Corson |
| 10,171,305 B2 | 1/2019 | Corson |

(Continued)

FOREIGN PATENT DOCUMENTS

| WO | WO 2014/140858 | 9/2014 |
| WO | WO 2014/150965 | 9/2014 |

OTHER PUBLICATIONS

PCT Application No. PCT/IB2014/001019 International Preliminary Report on Patentability dated Sep. 15, 2015.
(Continued)

*Primary Examiner* — Farzana B Huq
(74) *Attorney, Agent, or Firm* — Polsinelli LLP

(57) ABSTRACT

Profile generation for bandwidth management is provided. A content provider receive a notification regarding a new application or media file. Profile information for the application or media file is determined. Such profile information includes information regarding consumption of bandwidth throughout a time period of usage of the application or media file. The profile may be stored in memory in association with the application or media file. A request is received from a user device regarding access to the application or media file. Access to the requested application or media is provided to the user device; the profile is also provided to the user device for use in evaluating whether bandwidth requirements of the application or media file exceeds an available network bandwidth of a network of the user device.

21 Claims, 3 Drawing Sheets

Related U.S. Application Data continuation of application No. 15/479,078, filed on Apr. 4, 2017, now Pat. No. 10,171,305, which is a continuation of application No. 14/206,787, filed on Mar. 12, 2014, now Pat. No. 9,614,732.

(60) Provisional application No. 61/788,400, filed on Mar. 15, 2013.

(56) References Cited

U.S. PATENT DOCUMENTS

| | | | |
|---|---|---|---|
| 10,284,678 | B2 | 5/2019 | Corson |
| 10,985,988 | B2 | 4/2021 | Corson |
| 2006/0222015 | A1 | 10/2006 | Kafka et al. |
| 2006/0242315 | A1* | 10/2006 | Nichols .............. H04N 21/4424 348/E7.071 |
| 2007/0180073 | A1 | 8/2007 | Paul et al. |
| 2008/0013533 | A1 | 1/2008 | Bogineni et al. |
| 2008/0049615 | A1 | 2/2008 | Bugenhagen |
| 2008/0084896 | A1 | 4/2008 | Fleury et al. |
| 2008/0126621 | A1 | 5/2008 | Huang |
| 2008/0255692 | A1 | 10/2008 | Hofrichter et al. |
| 2008/0298376 | A1 | 12/2008 | Takeda et al. |
| 2009/0260045 | A1* | 10/2009 | Karlsson ............ H04N 21/6437 725/93 |
| 2011/0258336 | A1 | 10/2011 | Salomons |
| 2011/0314145 | A1 | 12/2011 | Raleigh et al. |
| 2013/0013782 | A1* | 1/2013 | Kim ...................... H04W 8/183 709/226 |
| 2013/0339528 | A1* | 12/2013 | Niemoeller ......... H04L 67/1038 709/226 |
| 2014/0141793 | A1 | 5/2014 | Bello et al. |
| 2014/0229579 | A1 | 8/2014 | Johnson |

OTHER PUBLICATIONS

PCT Application No. PCT/IB2014/001019 International Search Report and Written Opinion dated Oct. 28, 2014.
PCT Application No. PCT/US2014/024656 International Preliminary Report on Patentability dated Sep. 15, 2015.
PCT Application No. PCT/US2014/024656 International Search Report and Written Opinion dated Aug. 5, 2014.
U.S. Appl. No. 14/206,245 Final Office Action dated Jun. 15, 2018.
U.S. Appl. No. 14/206,245 Office Action dated Aug. 24, 2017.
U.S. Appl. No. 14/206,245 Final Office Action dated Jan. 27, 2017.
U.S. Appl. No. 14/206,245 Office Action dated Jul. 14, 2016.
U.S. Appl. No. 14/206,787 Office Action dated Jul. 27, 2016.
U.S. Appl. No. 15/479,078 Office Action dated Feb. 8, 2018.
U.S. Appl. No. 16/219,828 Office Action dated Apr. 17, 2020.

* cited by examiner

PROFILE GENERATION FOR BANDWIDTH MANAGEMENT

CROSS-REFERENCE TO RELATED APPLICATIONS

The present application is a continuation and claims the priority benefit of U.S. patent application Ser. No. 16/219,828 filed Dec. 13, 2018, now U.S. Pat. No. 10,985,988 which is a continuation of Ser. No. 15/479,078 filed Apr. 4, 2017, now U.S. Pat. No. 10,171,305 which is a continuation and claims the priority benefit of U.S. patent application Ser. No. 14/206,787 filed Mar. 12, 2014, now U.S. Pat. No. 9,614,732, which claims the priority benefit of U.S. provisional application 61/788,400 filed Mar. 15, 2013.

The present application is related to a U.S. patent application Ser. No. 14/206,245 filed Mar. 12, 2014, the disclosure of which is incorporated herein by reference.

BACKGROUND OF THE INVENTION

1. Field of the Invention

The present invention generally relates to bandwidth management. More specifically, the present invention relates to profile generation for bandwidth management.

2. Description of the Related Art

There are a variety of presently available devices whose uses involve different bandwidth requirements in a network. Many of the devices may be used simultaneously in the same network. Users may also use multiple applications or stream media files that demand bandwidth at the same time. For example, one user may use a device to stream high-definition video, while another is playing a game. A problem may arise in some circumstances when multiple devices, applications, and media files are being used at the same time. Specifically, such competing bandwidth requirements may cause such issues as video freeze-ups (to allow for buffering) and stalls in online applications, such as games.

One presently available way for dealing with competing bandwidth requirements has been to buffer as much content as possible. Such use of a buffer may be inefficient, however, as it may place a high load on the computer serving the content and further fails to address the different bandwidth consumption among multiple devices in the network. Moreover, such a method requires a large buffer memory.

Another presently available way to manage bandwidth has been to prioritize certain applications over others. Such prioritizations are usually based on preferences and guesswork as to which devices should be allotted more bandwidth, while bandwidth to other devices may be throttled. Such methods are similarly inefficient, as such guesswork may still unfairly leave some devices starving for bandwidth, while other devices are provided with ample bandwidth even when they do not necessarily need it.

Yet another available way to manage bandwidth is to drop to a lower quality version (e.g., of a movie stream). Such an option may be displeasing to users, as well as content providers whose businesses rely on satisfying their users.

There is therefore a need for improved systems and methods for profile generation for bandwidth management.

SUMMARY OF THE INVENTION

Embodiments of the present invention include systems and methods for profile generation for bandwidth management. A content provider receive a notification regarding a new application or media file. Profile information for the application or media file is determined. Such profile information includes information regarding consumption of bandwidth throughout a time period of usage of the application or media file. The profile may be stored in memory in association with the application or media file. A request is received from a user device regarding access to the application or media file. Access to the requested application or media is provided to the user device; the profile is also provided to the user device for use in evaluating whether bandwidth requirements of the application or media file exceeds an available network bandwidth of a network of the user device.

Various embodiments of the present invention include methods for profile generation for bandwidth management. Such methods may include receiving a notification regarding a application or media file, determining profile information for the application or media file, wherein the profile information includes at least information regarding consumption of bandwidth throughout a time period of usage associated with the application or media file, storing the profile in memory in association with the application or media file, receiving a request from a user device regarding access to the application or media file, and providing the requested application or media to the user device, wherein the profile is also provided to the user device for use in evaluating whether bandwidth requirements of the application or media file exceeds an available network bandwidth of a network of the user device.

Embodiments of the present invention may further include systems for profile generation for bandwidth management. Such systems may include a content provider that receives a notification regarding a application or media file and determines profile information that includes at least information regarding consumption of bandwidth throughout a time period of usage of the application or media file, and stores the profile in memory in association with the application or media file. Systems may further include a user device that sends a request to the content provider regarding access to the application or media file, receives the requested application or media to the user device, wherein the profile is also provided, and evaluates whether bandwidth requirements of the application or media file exceeds an available network bandwidth of a network of the user device, the evaluation based on the profile.

Other embodiments of the present invention include non-transitory computer-readable storage media on which is embodied instructions executable to generate profiles for bandwidth management in general accordance with the method previously set forth above.

DETAILED DESCRIPTION

Embodiments of the present invention allow for profile generation for bandwidth management. A content provider receive a notification regarding a new application or media file. Profile information for the application or media file is determined. Such profile information includes information regarding consumption of bandwidth throughout a time period of usage of the application or media file. The profile may be stored in memory in association with the application or media file. A request is received from a user device regarding access to the application or media file. Access to the requested application or media is provided to the user device; the profile is also provided to the user device for use in evaluating whether bandwidth requirements of the application or media file exceeds an available network bandwidth of a network of the user device.

Figure 1:
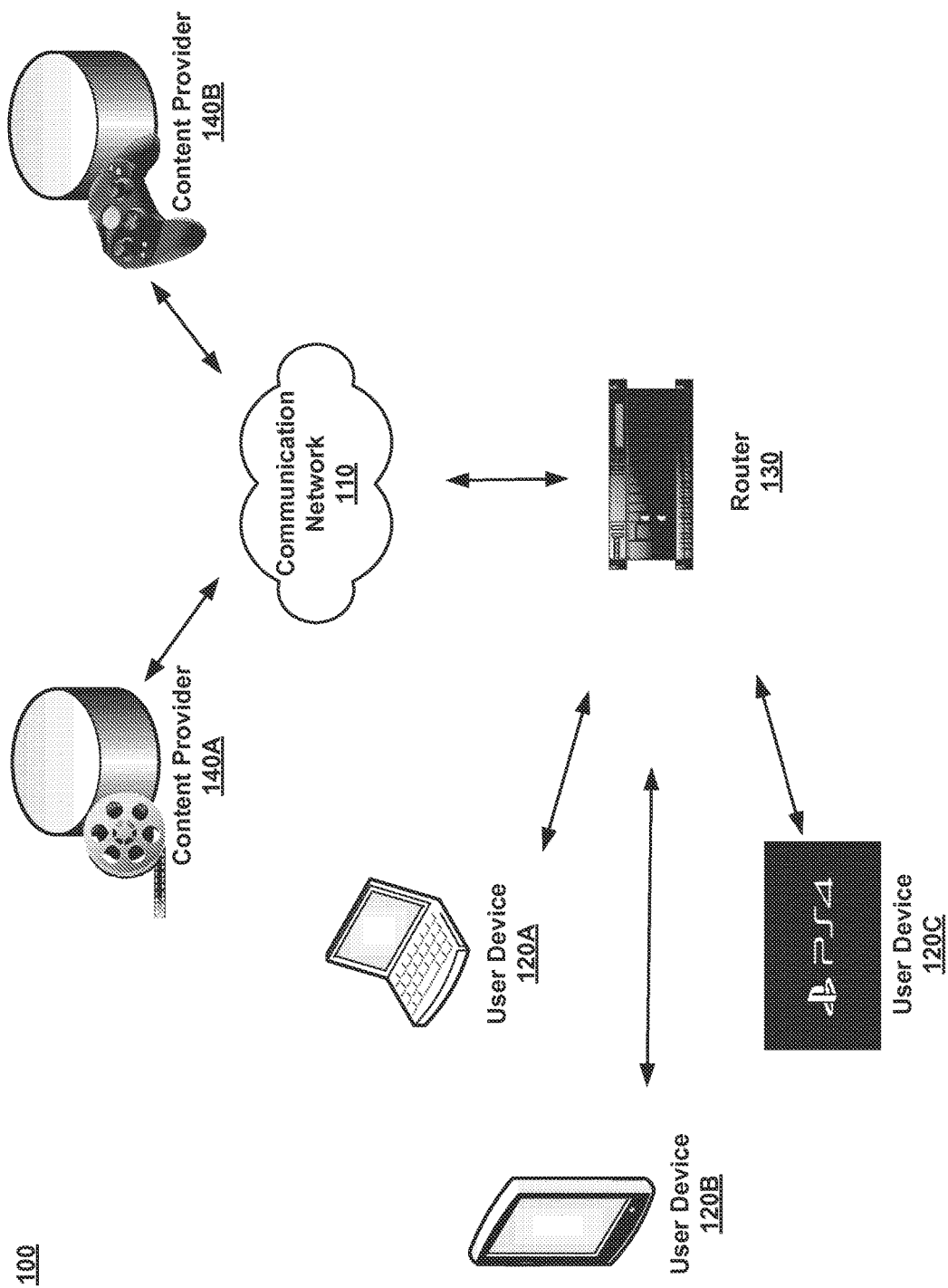
FIG. 1 illustrates a network environment in which a system of profile generation for bandwidth management may be implemented.

FIG. 1 illustrates an exemplary environment 100 in which a system of profile generation for bandwidth management may be implemented. In network environment 100, one or more user devices 120 may be in a network associated with a router 130, which is connected to a communication network 110. Environment 100 may additionally include one or more content providers 140A-B. While the present invention refers to content providers, such content providers may further encompass various service providers that provide user devices 120A-C with access to various applications, including games.

Communication network 110 may be part of the Internet, which is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network 110 may allow for communication between the various components of environment 100.

Users may use any number of different electronic user devices 120, such as mobile phones, smartphones, personal digital assistants (PDAs), portable computing devices (e.g., laptop, netbook, tablets), desktop computing devices, game console, handheld gaming device, or any other type of computing device capable of communicating over communication network 110. User device 120 may be further associated with or accessory to a general-purpose computer, a set-top box, a Blu-Ray® player, an electronic gaming system, or a home entertainment device (e.g., Sony PlayStation®3 or Playstation®4), as well as any one of a number of portable media devices (e.g., Sony PlayStation® Portable (PSP®)). Each user device 120 may also be configured to access data from other storage media, such as memory cards or disk drives as may be appropriate in the case of downloaded content. User device 120 may include standard computing components such as network and media interfaces, non-transitory computer-readable storage (memory), and processors for executing instructions that may be stored in memory.

Figure 2A:
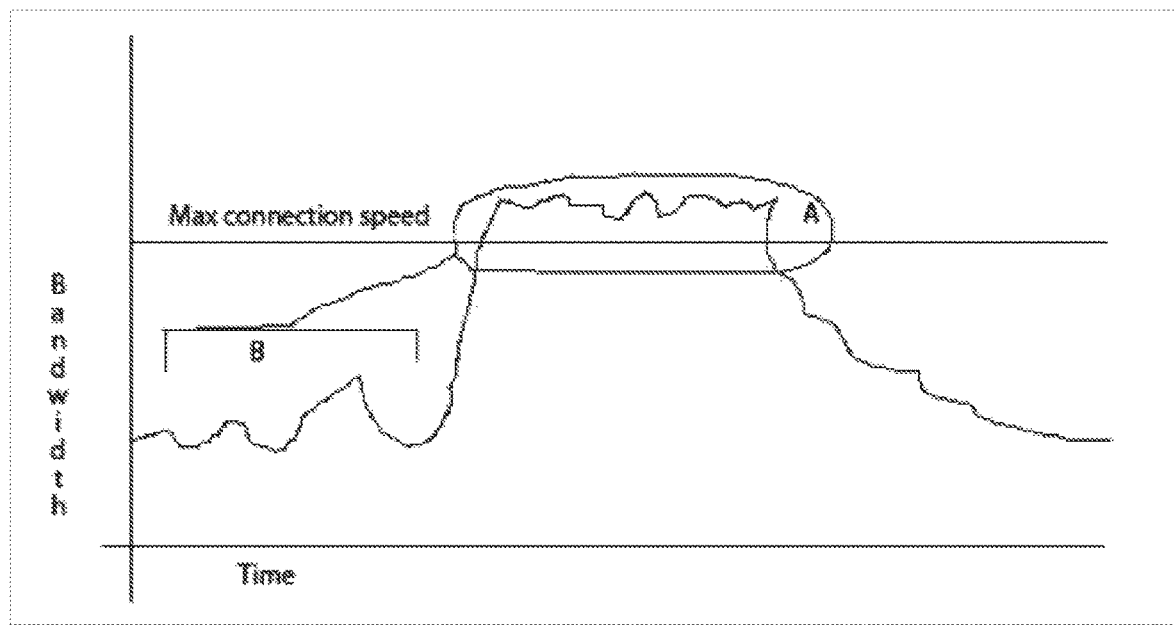
FIG. 2A illustrates an exemplary profile of an application or media file illustrating bandwidth consumption over time.

In an exemplary embodiment, user device 120A may request that a movie be streamed from an online content provider (e.g., content provider 140A). In addition to providing access to the movie, the content provider 140A may provide user device 120A with a profile associated with the requested movie. An exemplary profile is illustrated in FIG. 2A, in which bandwidth usage by an application or media file is tracked over the period of use, play, or execution. For example, the requested movie may have a three-hour playtime. Throughout the course of those three hours, bandwidth usage may fluctuate. As can be seen in FIG. 2A, bandwidth usage starts out relatively low during period B (e.g., hour 1), but as usage continues, the bandwidth usage spikes during period A (e.g., hour 2) before subsiding for the rest of the movie. For the particular network to which the movie is being streamed, the bandwidth requirements of the movie exceeds the available network bandwidth (e.g., maximum connection speed) during period A. While maximum connection speed may vary from network to network, the profile can be used by user device 120A to determine whether and when bandwidth requirements of a particular application or media file exceeds available network bandwidth.

Because user device 120A is able to use the profile to predict that bandwidth requirements will spike during period A, user device 120B can use available bandwidth during period B to build a buffer in anticipation. Moreover, the size of the buffer may also be based on the extent to which the bandwidth during period A exceeds the maximum connection speed. As such, when the movie reaches period A, no skipping or freezing would occur. Further, bandwidth requirements during the three hour stream would be stabilized, as well as reducing buffering requirements and load on the server.

In a typical buffering scheme lacking such profile information, the movie stream may play normally during period B, but upon reaching period A, the stream may no longer be downloaded fast enough. As such, the movie may freeze or skip. Moreover, because such a buffering scheme is unaware of the pattern of fluctuation, unnecessary buffering may occur during period B or after period A. Such unnecessary buffering is an inefficient use of buffer memory.

Embodiments of the claimed invention may also take multiple user devices 120A-C into account. FIGURE B, for example, illustrates two profiles of applications and/or media files being used within a network. Although neither stream individually exceeds the connection speed, the combination of the two streams results in a spike in total bandwidth requirements, which would exceed the connection speed during period A. As such, the ability to predict such spikes (e.g., including spikes involving multiple streams) and the timing of such spikes allows for the ability to pre-fetch and buffer accordingly. Moreover, the pre-fetching and buffering may also occur more efficiently in a manner tailored to the particular bandwidth requirements of the applications and/or media files being played.

In such instances, the user devices 120A-C may exchange profile information and collaborate in coordinating such management of bandwidth among the user devices 120A-C. Such exchanges and communications regarding collaboration may occur via standard messages through the network.

Alternatively, the coordination may be provided by a router, such as router 130. Router 130 may be any kind of router known in the art for forwarding data packets between computer networks. In some embodiments of the claimed invention, router 130 may perform certain coordination functions among the user devices 120A-C in the network. For example, the router 130 may gather profile information from all the user devices 120A-C that are using bandwidth-consuming applications and/or media files. Based on such profile information, router 130 may allocate bandwidth and communicate instructions to user devices 120A-C regarding how/when to use bandwidth. Where a router 130 allocates bandwidth, router 130 may incorporate various prioritization schemes for instances of extremely heavy use. While some current routers may have some prioritization capabilities, the lack of profile information means that such prioritization does not occur as efficiently. The use of profiles allows router 130 to instruct user devices 120A-C as to how and when to use bandwidth so as to provide the best quality service to the most user devices 120A-C over time.

Content providers 140A-B may host and provide user devices 120A-C with access to various applications and media files. In some embodiments, the content providers 140A-B may also store profiles associated with each application or media file. Content providers 140A-B may include any number of servers for performing its functions. Such servers may include any computing device as is known in the art, including standard computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Content providers 140A-B may generate and store the profiles for the applications and/or media files that they host. A typical profile may include such information as estimate of average bandwidth required, peak bandwidth required, a minute-by-minute (or other time chunks) account of bandwidth required over time, minimum/maximum latency requirements, type of application/media file, whether bandwidth requirements are steady or tends to spike (and to what degree), and how long an application can go without network access without failing, and other related information. For media files, for example, a profile may provide information regarding bandwidth usage and requirements (e.g., average bit rate) for each minute of play. In contrast, certain applications, such as games, may be slightly more variable in terms of bandwidth usage and requirements. There may, however, still be predictable sequences of fluctuations that can be reflected in a profile. For example, a game may have predictable periods of latency and bandwidth. Such a profile may be updated in real-time based on certain events occurring within a game, which trigger such predictable periods. Such a real-time update may indicate that the application needs, e.g., 2 mbps of bandwidth for the next 20 minutes or 100 ms latency but only 0.5 mbps bandwidth.

Figure 3:
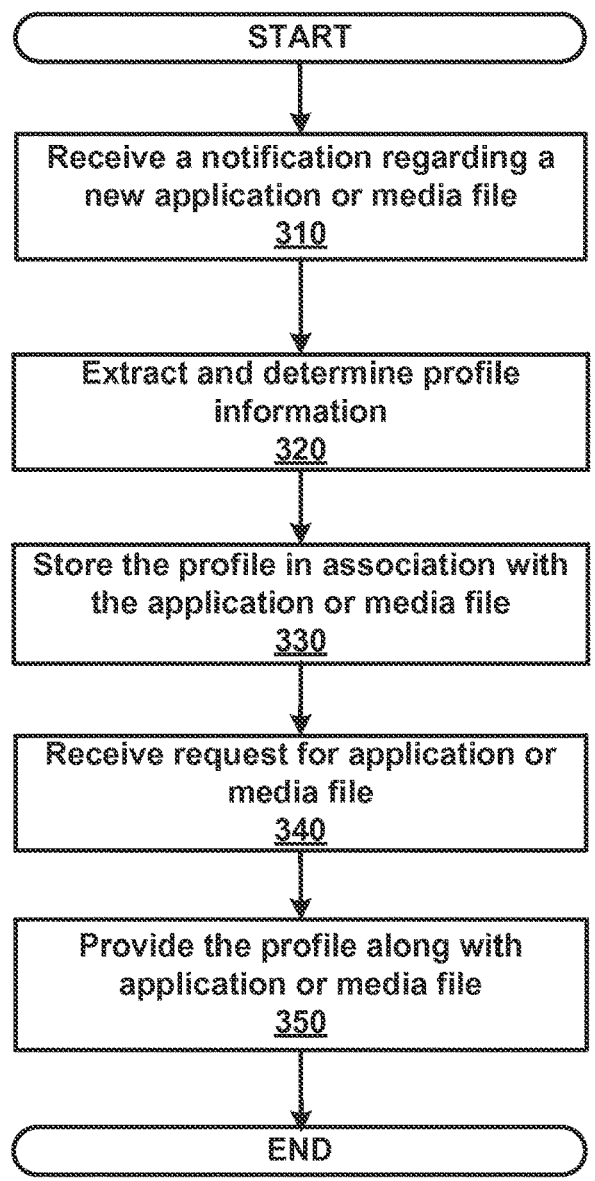
FIG. 3 is a flowchart illustrating a method for profile generation for bandwidth management.

FIG. 3 is a flowchart illustrating an exemplary method 300 for bandwidth management based on profiles. The method 300 of FIG. 3 may be embodied as executable instructions embodied in a computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 3 (and the order thereof) are exemplary and may include various alternatives, equivalents, or derivations thereof including but not limited to the order of execution of the same.

In method 300 as illustrated in FIG. 3, a notification is received concerning a new application or media file, profile information is determined, the profile is stored in memory in associated with the new application or media file, a request for the application or media file is received from a user device, and the requested application or media file is provided to the user device in conjunction with the profile.

In step 310, a content provider 140A may receive a notification regarding a new application or media file. Such a new application or media file may be a new offering to be made available for streaming or otherwise providing to users of user devices 120A-C.

Figure 2B:
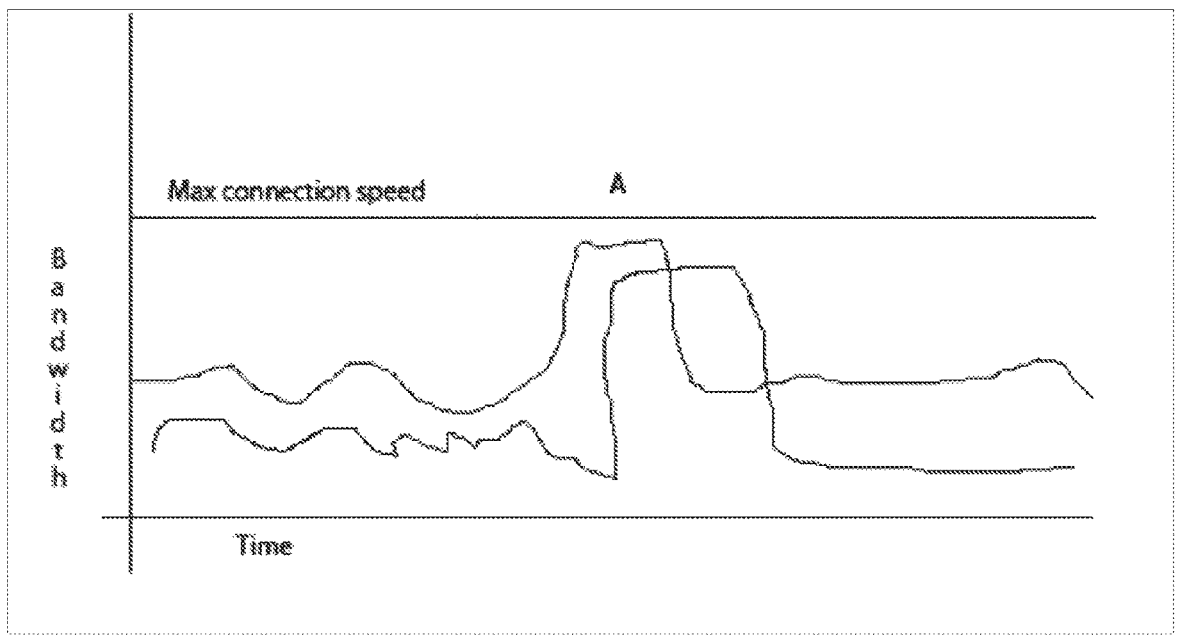
FIG. 2B illustrates two profiles illustrating bandwidth consumption over time.

In step 320, profile information is determined form the new application or media file. Such information may be provided in whole or in part by makers or developers of the applications and/or media files. Alternatively, some profile information may be determined based on analysis of the application or media file by the content providers 140A-C. For example, the various measurement tools known in the art may be used to evaluate the application or media file during its time period of usage. Such measurements and other analytical data may be incorporated into a profile that is associated with the application or media file. Exemplary profiles are illustrated in FIGS. 2A-B, which provide information regarding bandwidth usage over time.

In step 330, the profile generated in step 320 is stored or otherwise maintained by content providers 140A-C. Content providers 140A-C may encompass one or multiple databases for storing such profile information for various applications and/or media files.

In step 340, a user request for an application or media file is sent from user device 120A to content provider 140A. In response, the content provider 140A may provide (e.g., stream) the requested application or media file to the user device 120A in step 350. The provided application or media file may be sent in conjunction with an associated profile that provides information as to how much bandwidth is used by the application or media file and associated timing regarding bandwidth fluctuations. Where the request concerns a movie, for example, an associated profile—which may be similar to that illustrated in FIG. 2A—may be sent to the requesting user device 120A.

The user device 120A may access such profile information sent along with the streamed movie, and in step 340, determine bandwidth requirements based on the profile. Referring the profile illustrated in FIG. 2A, such a determination may involve identifying that a spike in bandwidth requirement will occur during the second hour (e.g., period A) of the movie. Further, it may be determined that the spike in bandwidth requirements exceeds available bandwidth in the network.

In embodiments where there are multiple user devices 120A-C in the network streaming movies or playing games, multiple profiles may be accessed (e.g., exchanged or shared via standard messages) and used to determine total bandwidth requirements and evaluate the same in light of the available bandwidth. Such steps may be performed by the user devices 120A-C or by a router 130.

Further, the user device 120A may take steps to address the predicted spike. Such steps may include building a buffer before the spike occurs (e.g., during period B) so that when period A is reached, the movie may continue to be played smoothly without any skips or freezing. The size of the buffer built during period B may also be based on the extent to which the predicted spike exceeds available bandwidth.

Where collaboration between multiple user devices 120A-C or central coordination by a router 130 is involved, such steps to manage bandwidth may involve providing notifications or instructions as to when and to what extent to buffer or otherwise prepare for a spike at certain points during the time period of usage.

The present invention may be implemented in an application that may be operable using a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

The invention claimed is:

1. A method for profile generation for bandwidth management, the method comprising:
   evaluating bandwidth requirements for streaming a resource during a play time period in which the resource is played, wherein the bandwidth requirements for streaming different portions of the resource fluctuate during the play time period;
   constructing a resource profile for the resource based on the evaluation of the bandwidth requirements, wherein the resource profile includes a pattern of fluctuating bandwidth consumption over the play time period during which one or more of the different portions of the resource is streamed;
   monitoring a current stream of the resource to a user device over an associated communication network, wherein the current stream is monitored based on the constructed resource profile and one or more conditions of the associated communication network; and
   generating an instruction concerning an adjustment to the current stream of the resource based on the constructed resource profile, wherein the adjustment specifies a bandwidth allotment for the user device corresponding to the conditions of the associated communication network.

2. The method of claim 1, wherein the pattern of the bandwidth consumption includes one or more predictable fluctuation sequences in bandwidth consumption.

3. The method of claim 1, wherein the pattern of the bandwidth consumption includes one or more spikes in bandwidth consumption.

4. The method of claim 3, wherein the instruction specifies building a buffer before the one or more spikes in bandwidth occurs in the current stream, and wherein building the buffer includes pre-fetching a portion of the resource before the portion of the resource is due to be played in the current stream.

5. The method of claim 4, wherein the instruction further specifies a size of the buffer based on the one or more spikes in bandwidth consumption.

6. The method of claim 1, further comprising transmitting the instruction to the user device or to a router of the associated communication network.

7. The method of claim 1, wherein the instruction includes a prioritization scheme prioritizing bandwidth usage by one or more applications currently consuming bandwidth in the associated communication network.

8. The method of claim 1, wherein the one or more conditions of the associated communication network includes bandwidth available in the associated communication network, and wherein the adjustment further includes a bandwidth allotment to one or more other user devices in the associated communication network.

9. The method of claim 8, wherein generating the instruction is further based on one or more patterns of bandwidth consumption of the other user devices in the associated communication network.

10. The method of claim 9, wherein generating the instruction is further based on an overlap of the patterns of bandwidth consumption of the user device and the other user devices in the associated communication network.

11. A system for profile generation for bandwidth management, the system comprising:
    a memory; and
    a server that executes instructions stored in memory, wherein execution of the instructions by a processor:
      evaluates bandwidth requirements for streaming a resource during a play time period in which the resource is played, wherein the bandwidth requirements for streaming different portions of the resource fluctuate during the play time period;
      constructs a resource profile for the resource based on the evaluation of the bandwidth requirements, wherein the resource profile includes a pattern of fluctuating bandwidth consumption over the play time period during which one or more of the different portions of the resource is streamed;
      monitors a current stream of the resource to a user device over an associated communication network, wherein the current stream is monitored based on the constructed resource profile and one or more conditions of the associated communication network; and
      generates an instruction for the user device concerning an adjustment to the current stream of the resource based on the constructed resource profile, wherein the adjustment specifies a bandwidth allotment for the user device corresponding to the conditions of the associated communication network.

12. The system of claim 11, wherein the pattern of the bandwidth consumption includes one or more predictable fluctuation sequences in bandwidth consumption.

13. The system of claim 11, wherein the pattern of the bandwidth consumption includes one or more spikes in bandwidth consumption.

14. The system of claim 13, wherein the instruction specifies building a buffer before the one or more spikes in bandwidth occurs in the current stream, and wherein building the buffer includes pre-fetching a portion of the resource before the portion of the resource is due to be played in the current stream.

15. The system of claim 14, wherein the instruction further specifies a size of the buffer based on the one or more spikes in bandwidth consumption.

16. The system of claim 11, wherein the server transmits the instruction to the user device or to a router of the associated communication network.

17. The system of claim 11, wherein the instruction includes a prioritization scheme prioritizing bandwidth usage by one or more applications currently consuming bandwidth in the associated communication network.

18. The system of claim 11, wherein the one or more conditions of the associated communication network includes bandwidth available in the associated communication network, and wherein the adjustment further includes a bandwidth allotment to one or more other user devices in the associated communication network.

19. The system of claim 18, wherein the instruction is further based on one or more patterns of bandwidth consumption of the other user devices in the associated communication network.

20. The system of claim 19, wherein the instruction is further based on an overlap of the patterns of bandwidth consumption of the user device and the other user devices in the associated communication network.

21. A non-transitory computer-readable storage medium, having embodied thereon a program executable by a processor to perform a method for profile generation for bandwidth management, the method comprising:

evaluating bandwidth requirements for streaming a resource during a play time period in which the resource is played, wherein the bandwidth requirements for streaming different portions of the resource fluctuate during the play time period;

constructing a resource profile for the resource based on the evaluation of the bandwidth requirements, wherein the resource profile includes a pattern of fluctuating bandwidth consumption over the play time period during which one or more of the different portions of the resource is streamed;

monitoring a current stream of the resource to a user device over an associated communication network, wherein the current stream is monitored based on the constructed resource profile and one or more conditions of the associated communication network; and generating an instruction concerning an adjustment to the current stream of the resource based on the constructed resource profile, wherein the adjustment specifies a bandwidth allotment for the user device corresponding to the conditions of the associated communication network.

* * * * *